(12) United States Patent
Steele et al.

(10) Patent No.: US 9,074,646 B2
(45) Date of Patent: Jul. 7, 2015

(54) SEALED HIGH CAPACITY OVERRUNNING ROLLER CLUTCH

(75) Inventors: Sean Steele, Mississauga (CA); Jianwen Li, Vaughan (CA); John Sabo, Caledon (CA); Richard D. Muizelaar, Mississauga (CA)

(73) Assignee: Magna Powertrain Inc., Concord, Ontario (CA)

( * ) Notice: Subject to any disclaimer, the term of this patent is extended or adjusted under 35 U.S.C. 154(b) by 980 days.

(21) Appl. No.: 13/119,144

(22) PCT Filed: Sep. 15, 2009

(86) PCT No.: PCT/CA2009/001288
§ 371 (c)(1),
(2), (4) Date: Mar. 15, 2011

(87) PCT Pub. No.: WO2010/028511
PCT Pub. Date: Mar. 18, 2010

(65) Prior Publication Data
US 2011/0168119 A1   Jul. 14, 2011

Related U.S. Application Data

(60) Provisional application No. 61/096,946, filed on Sep. 15, 2008.

(51) Int. Cl.
*F02N 15/02* (2006.01)
*F16D 41/06* (2006.01)
(Continued)

(52) U.S. Cl.
CPC ........... *F16D 41/067* (2013.01); *F02N 11/0818* (2013.01); *F02N 15/023* (2013.01); *F02N 15/063* (2013.01); *F02N 2250/08* (2013.01); *F16D 2300/06* (2013.01)

(58) Field of Classification Search
CPC .............................. F16D 41/067; F16D 15/00
USPC .......................... 123/179.25; 192/45.1; 74/6; 903/912–913
See application file for complete search history.

(56) References Cited

U.S. PATENT DOCUMENTS

| 1,515,247 A | 11/1924 | Forsyth |
| 2,355,805 A | 8/1944 | Koepp |

(Continued)

FOREIGN PATENT DOCUMENTS

| CN | 2213253 | 11/1995 |
| EP | 0 176 767 A1 | 4/1986 |

(Continued)

OTHER PUBLICATIONS

Chinese office action mailed Nov. 21, 2012.

*Primary Examiner* — Mahmoud Gimie
*Assistant Examiner* — David Hamaoui
(74) *Attorney, Agent, or Firm* — Dickinson Wright PLLC

(57) ABSTRACT

A clutch assembly includes an inner race, an outer race and a plurality of roller elements positioned radially therebetween. The clutch assembly also includes a cage assembly, a seal and a retaining ring. The cage assembly includes a skeleton coupled to a spring ring having a plurality of radially extending guides arranged to circumferentially space apart each roller element in alignment with cam surfaces formed on the outer race. The guides are resiliently deformable to allow concurrent engagement of each roller element with both the inner and outer races. The seal engages an inner surface of the outer race and an outer surface of the inner race, and is positioned axially outboard of the roller elements. The retaining ring is positioned within ring grooves formed on each of the inner and outer races to restrict movement of the cage.

36 Claims, 16 Drawing Sheets

(51) Int. Cl.
*F16D 41/067* (2006.01)
*F02N 11/08* (2006.01)
*F02N 15/06* (2006.01)

(56) References Cited

U.S. PATENT DOCUMENTS

| | | | |
|---|---|---|---|
| 3,241,641 A | | 3/1966 | Cowles |
| 3,732,956 A | | 5/1973 | Johnson et al. |
| 4,036,338 A | | 7/1977 | Linn et al. |
| 4,178,805 A | | 12/1979 | Mazzorana |
| 4,206,837 A | * | 6/1980 | Brown et al. .................. 192/90 |
| 4,776,237 A | | 10/1988 | Premiski et al. |
| 4,782,928 A | | 11/1988 | Lederman |
| 4,821,857 A | | 4/1989 | Groh |
| 4,828,086 A | | 5/1989 | Lederman |
| 4,850,462 A | | 7/1989 | Lederman |
| 4,987,670 A | | 1/1991 | Papania |
| 5,033,878 A | | 7/1991 | Tsuji et al. |
| 5,042,628 A | | 8/1991 | Malecha |
| 5,052,518 A | | 10/1991 | Trommer |
| 5,099,972 A | | 3/1992 | Ouchi |
| 5,135,085 A | * | 8/1992 | Kinoshita et al. .......... 192/41 R |
| 5,176,232 A | * | 1/1993 | Malecha .................. 192/45.014 |
| 5,279,399 A | | 1/1994 | Riggle |
| 5,279,400 A | | 1/1994 | Riggle et al. |
| 5,441,452 A | | 8/1995 | Jackel et al. |
| 5,445,255 A | * | 8/1995 | Rutke et al. ................... 192/45.1 |
| 5,474,152 A | | 12/1995 | Wilkinson et al. |
| 5,476,165 A | | 12/1995 | Awaji et al. |
| 5,607,036 A | * | 3/1997 | Costin .......................... 192/45.1 |
| 5,636,720 A | | 6/1997 | Lederman |
| 5,667,046 A | | 9/1997 | Stanton et al. |
| 5,671,836 A | * | 9/1997 | Shirataki et al. .......... 192/113.32 |
| 5,908,094 A | * | 6/1999 | Le-Calve ................... 192/41 R |
| 5,966,985 A | | 10/1999 | Shuto et al. |
| 6,092,634 A | | 7/2000 | Kremer et al. |
| 6,092,636 A | | 7/2000 | Muramatsu |
| 6,161,668 A | * | 12/2000 | Le Calve et al. ............ 192/41 A |
| 6,374,974 B1 | | 4/2002 | Wake |
| 6,401,893 B1 | | 6/2002 | Kinoshita |
| 6,415,489 B1 | | 7/2002 | Martins et al. |
| 6,443,289 B1 | | 9/2002 | Sagae et al. |
| 6,530,464 B2 | | 3/2003 | Ogata et al. |
| 6,543,592 B2 | * | 4/2003 | Hori .......................... 192/45.004 |
| 6,705,444 B2 | * | 3/2004 | Fujiwara et al. ......... 192/45.006 |
| 6,712,188 B2 | | 3/2004 | Ando |
| 6,769,525 B2 | | 8/2004 | Pascoe |
| 6,796,414 B2 | * | 9/2004 | Hu et al. .................... 192/45.01 |
| 6,814,198 B2 | | 11/2004 | Pascoe |
| 6,837,352 B2 | | 1/2005 | Ohishi |
| 6,932,206 B2 | * | 8/2005 | Miura et al. ................. 192/45.1 |
| 7,143,881 B2 | * | 12/2006 | Ichihara et al. .......... 192/45.009 |
| 7,322,455 B2 | | 1/2008 | Vetter et al. |
| 7,353,926 B2 | * | 4/2008 | Ikeda et al. ................. 192/45.1 |
| 7,370,741 B2 | * | 5/2008 | Shimomura et al. ............ 192/42 |
| 7,406,768 B2 | | 8/2008 | Ikeda et al. ................ 29/898.042 |
| 7,448,480 B2 | * | 11/2008 | Shirataki et al. ............. 192/41 A |
| 7,472,672 B2 | | 1/2009 | Asada et al. |
| 7,910,525 B2 | * | 3/2011 | Mikami et al. ................. 508/165 |
| 8,220,607 B2 | | 7/2012 | Watanabe et al. ........ 192/45.015 |
| 8,240,286 B2 | * | 8/2012 | Li et al. ..................... 123/179.25 |
| 8,464,680 B2 | * | 6/2013 | Gaborel et al. ............ 123/179.25 |
| 2002/0134636 A1 | * | 9/2002 | Ando ............................. 192/45 |
| 2004/0255890 A1 | | 12/2004 | Tsutsumi et al. |
| 2006/0266611 A1 | * | 11/2006 | Updyke et al. ................... 192/44 |
| 2007/0034030 A1 | | 2/2007 | Suzuki et al. |
| 2007/0267264 A1 | * | 11/2007 | Pederson ....................... 192/45 |
| 2008/0121202 A1 | | 5/2008 | Asada et al. ............. 123/185.14 |
| 2008/0163842 A1 | * | 7/2008 | Forssell et al. ........... 123/179.25 |
| 2008/0163843 A1 | | 7/2008 | Sakai et al. |
| 2008/0179156 A1 | * | 7/2008 | Byun .......................... 192/45.1 |
| 2008/0223156 A1 | | 9/2008 | Suzuki et al. |
| 2008/0230341 A1 | | 9/2008 | Barraud et al. |
| 2009/0071788 A1 | * | 3/2009 | Yamamoto ..................... 192/45 |
| 2012/0234281 A1 | * | 9/2012 | Steele et al. ............. 123/179.25 |

FOREIGN PATENT DOCUMENTS

| | | |
|---|---|---|
| EP | 1284213 A2 | 2/2003 |
| EP | 1293665 A2 | 3/2003 |
| EP | 1908954 A1 | 4/2008 |
| FR | 2906329 A1 | 3/2008 |
| GB | 1230808 A | 5/1971 |
| GB | 2073339 A | 10/1981 |
| JP | 57018823 A | 1/1982 |
| JP | 2005240930 A | 9/2005 |
| JP | 2006118378 | 5/2006 |
| JP | 200882186 | 4/2008 |
| JP | 2008121660 A | 5/2008 |
| WO | WO-2007012943 A1 | 2/2007 |
| WO | WO-2007148228 A1 | 12/2007 |

* cited by examiner

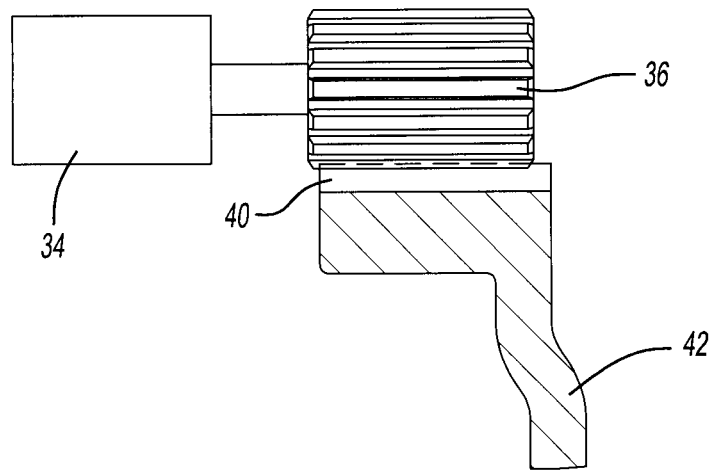
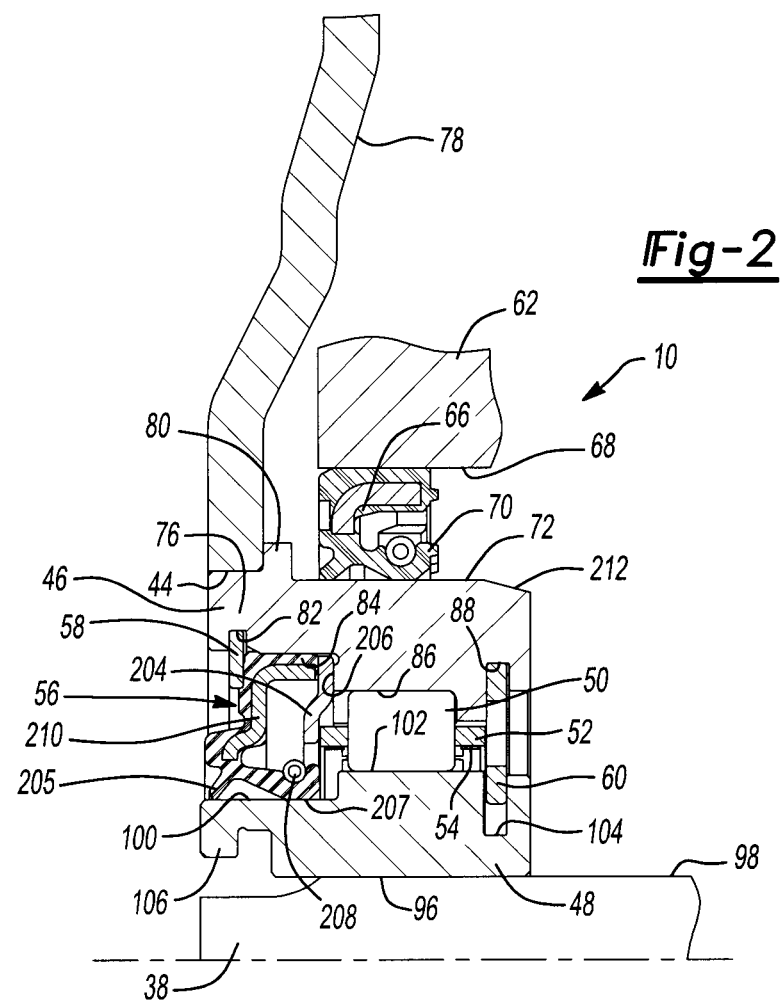
Fig-2

SEALED HIGH CAPACITY OVERRUNNING ROLLER CLUTCH

CROSS-REFERENCE TO RELATED APPLICATIONS

This application is a U.S. National Phase of International Application No. PCT/CA2009/001288 filed Sep. 15, 2009 and which claims the benefit of U.S. Provisional Application No. 61/096,946, filed on Sep. 15, 2008. The entire disclosure of the each of above applications is incorporated herein by reference.

TECHNICAL FIELD

The present disclosure generally relates to an overrunning roller clutch for selectively transferring torque between two rotatable components. More particularly, a sealed high capacity overrunning roller clutch having a simplified, compact design is disclosed.

BACKGROUND

The statements in this section merely provide background information related to the present disclosure and may not constitute prior art.

Hybrid vehicles having an internal combustion engine as a first source of motive power and an electric motor as a second source of motive power have become increasingly popular based on fuel costs and environmental concerns. In at least one hybrid vehicle, it may be beneficial to frequently start and stop the operation of the internal combustion engine to most efficiently operate the vehicle. To minimize and/or eliminate the noise, vibration and harshness associated with typical internal combustion engine starting systems, it may be desirable to position a starter motor gear in constant meshed engagement with a member of the internal combustion engine. To allow temporary driving interconnection between the starter motor and the internal combustion engine, it may be desirable to position a clutch along this power path.

While various clutch designs may be incorporated, specific cost, size, weight and torque carrying capacity concerns exist.

Traditional overrunning clutches may include an inner race having a smooth outer surface, an outer race having a cam profiled inner surface and rollers positioned between the inner race and the outer race. Each roller is held in position with a corresponding spring to allow the clutch to operate in a locked or an unlocked mode depending on relative rotation between the inner race and the outer race. Manufacturing tolerances of the various clutch components have typically combined to allow less than every clutch roller to simultaneously contact inner and outer races. Accordingly, the maximum torque transferred by the clutch is less than a torque magnitude that could be transferred if each roller were simultaneously sandwiched by the inner and outer races.

Furthermore, known overrunning clutches often lack concentricity between the inner race and the outer race when the clutch operates in the overrunning mode. This condition exists because the rollers are no longer in driving contact with both the inner and outer races and relative movement between the races is allowed. Depending on the components coupled to the inner and outer races, this lack of concentricity may provide undesirable results such as improper gear meshing, shaft support and the like. Based on the above-mentioned concerns, it may be desirable to provide an improved sealed high capacity overrunning roller clutch.

SUMMARY

A starting system for an internal combustion engine having a crankshaft rotatably supported within an engine block includes a starter motor, a pinion gear selectively driven by the starter motor and a drive plate having a set of teeth in constant meshed engagement with the pinion gear. The starting system further includes an overrunning clutch assembly adapted to selectively drivingly interconnect the drive plate and the crankshaft. The clutch assembly includes an inner race adapted to be fixed for rotation with the crankshaft, an outer race fixed for rotation with the drive plate and having circumferentially spaced apart cam surfaces, and a plurality of roller elements positioned radially therebetween. The clutch assembly also includes a cage assembly, a seal and a retaining ring. The cage assembly includes a skeleton coupled to a spring ring having a plurality of radially extending guides arranged to circumferentially space apart each roller element in alignment with cam surfaces formed on the outer race. The guides are resiliently deformable to allow concurrent engagement of each roller element with both the inner and outer races. The seal engages an inner surface of the outer race and an outer surface of the inner race, and is positioned axially outboard of the roller elements. The retaining ring is positioned within ring grooves formed on each of the inner and outer races to restrict movement of the cage.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a fragmentary cross-sectional view depicting an internal combustion engine starting system including a sealed high capacity overrunning roller clutch;

DETAILED DESCRIPTION

Figure 1:
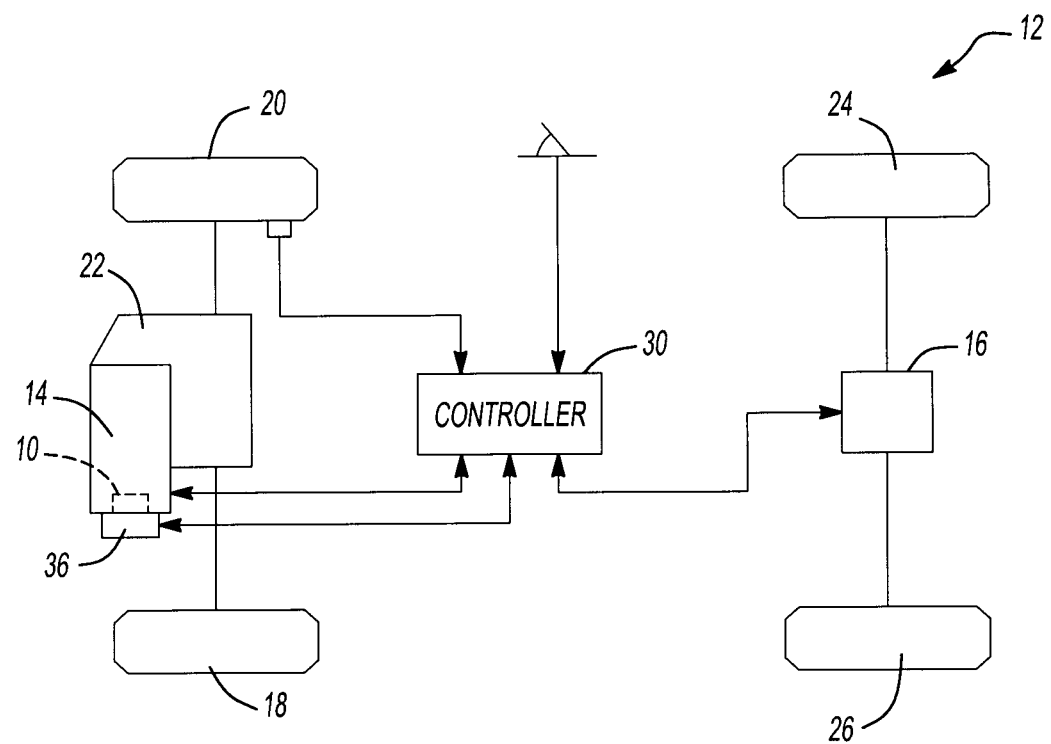
FIG. 1 is a schematic of an exemplary hybrid vehicle equipped with a sealed high capacity overrunning roller clutch.
Figure 3:
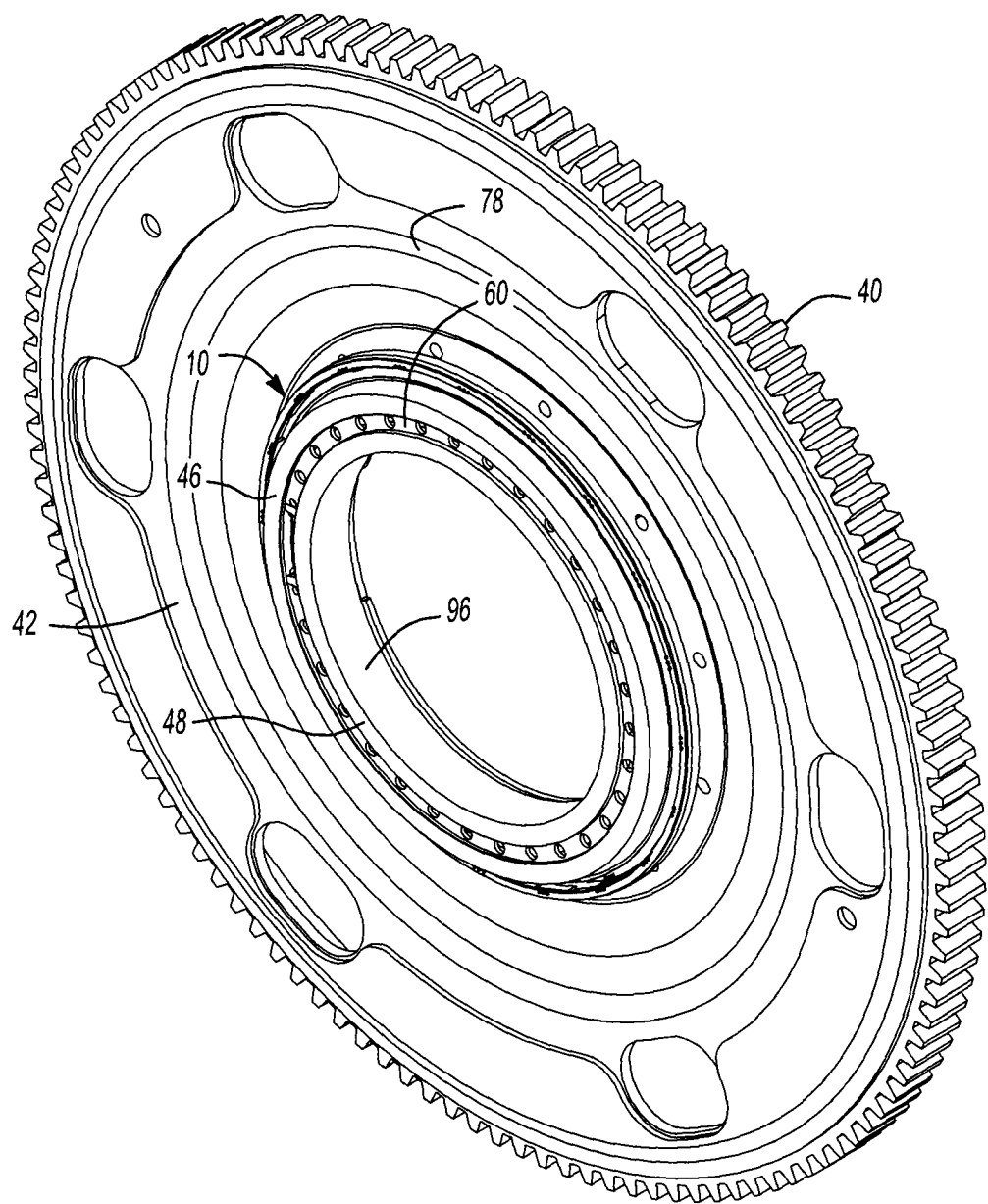
FIG. 3 is a perspective view of a roller clutch and drive plate assembly.
Figure 4:
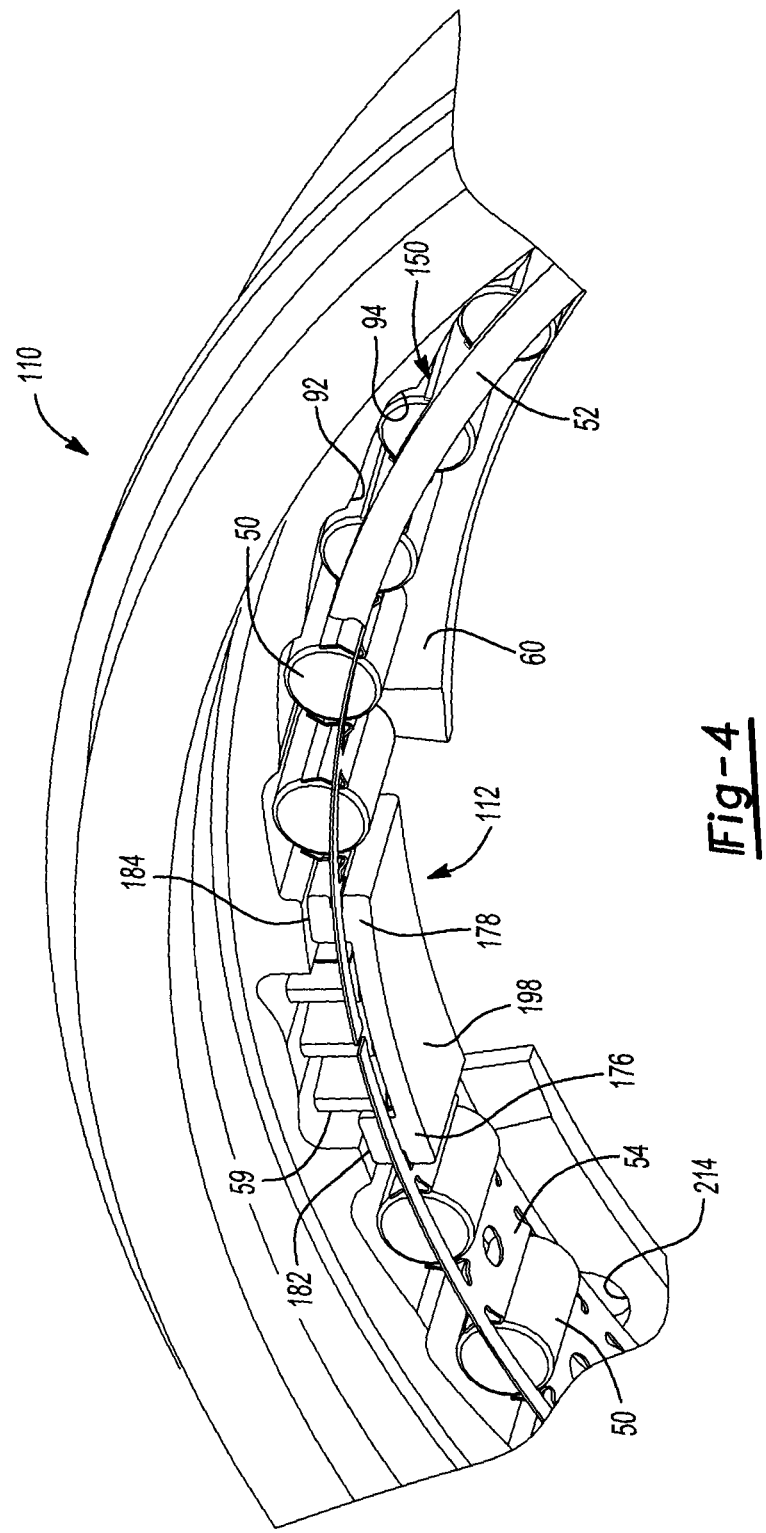
FIG. 4 is a fragmentary perspective view of a portion of the roller clutch.
Figure 5:
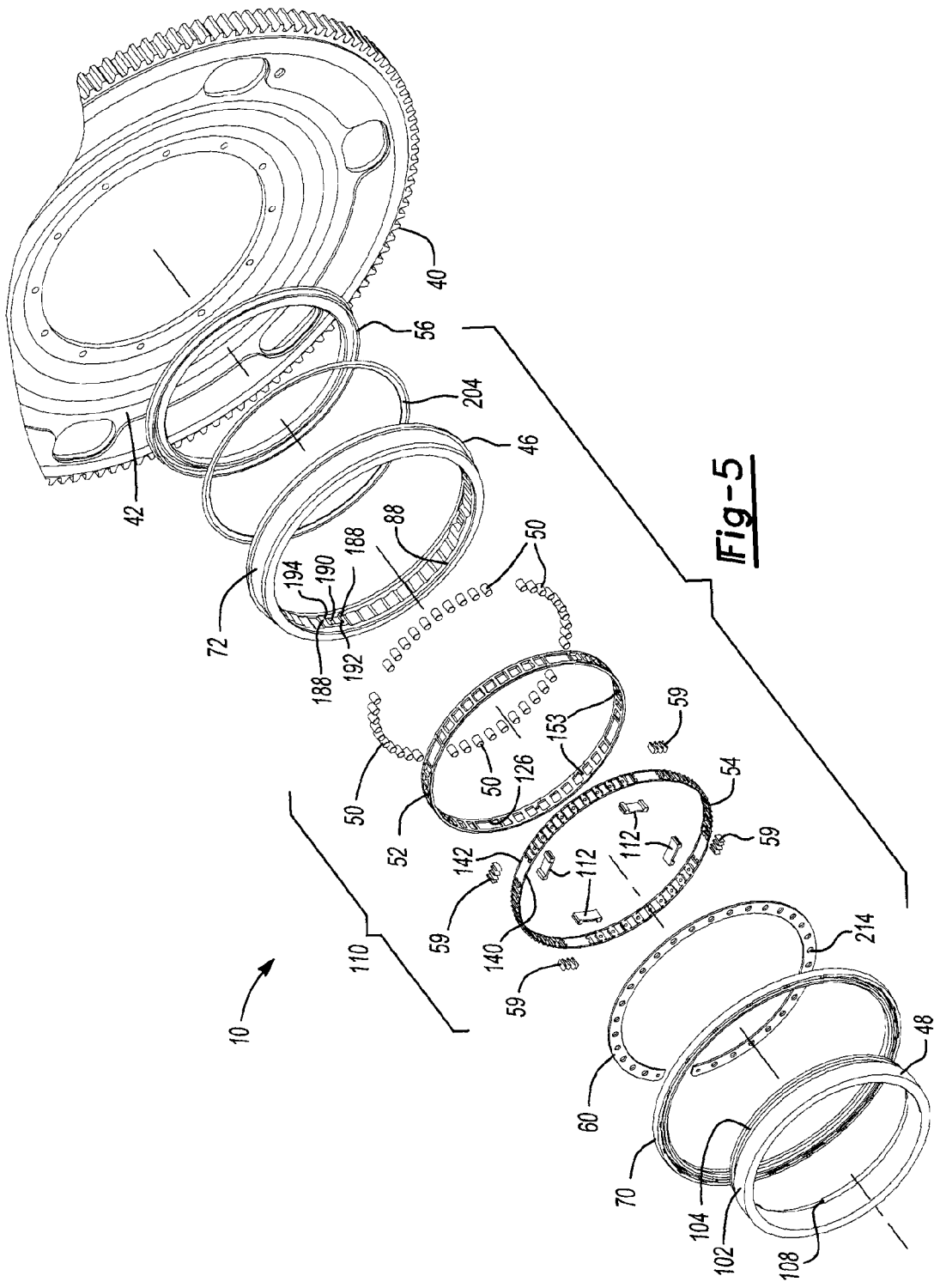
FIG. 5 is a fragmentary exploded perspective view of the drive plate and roller clutch assembly.
Figure 6:
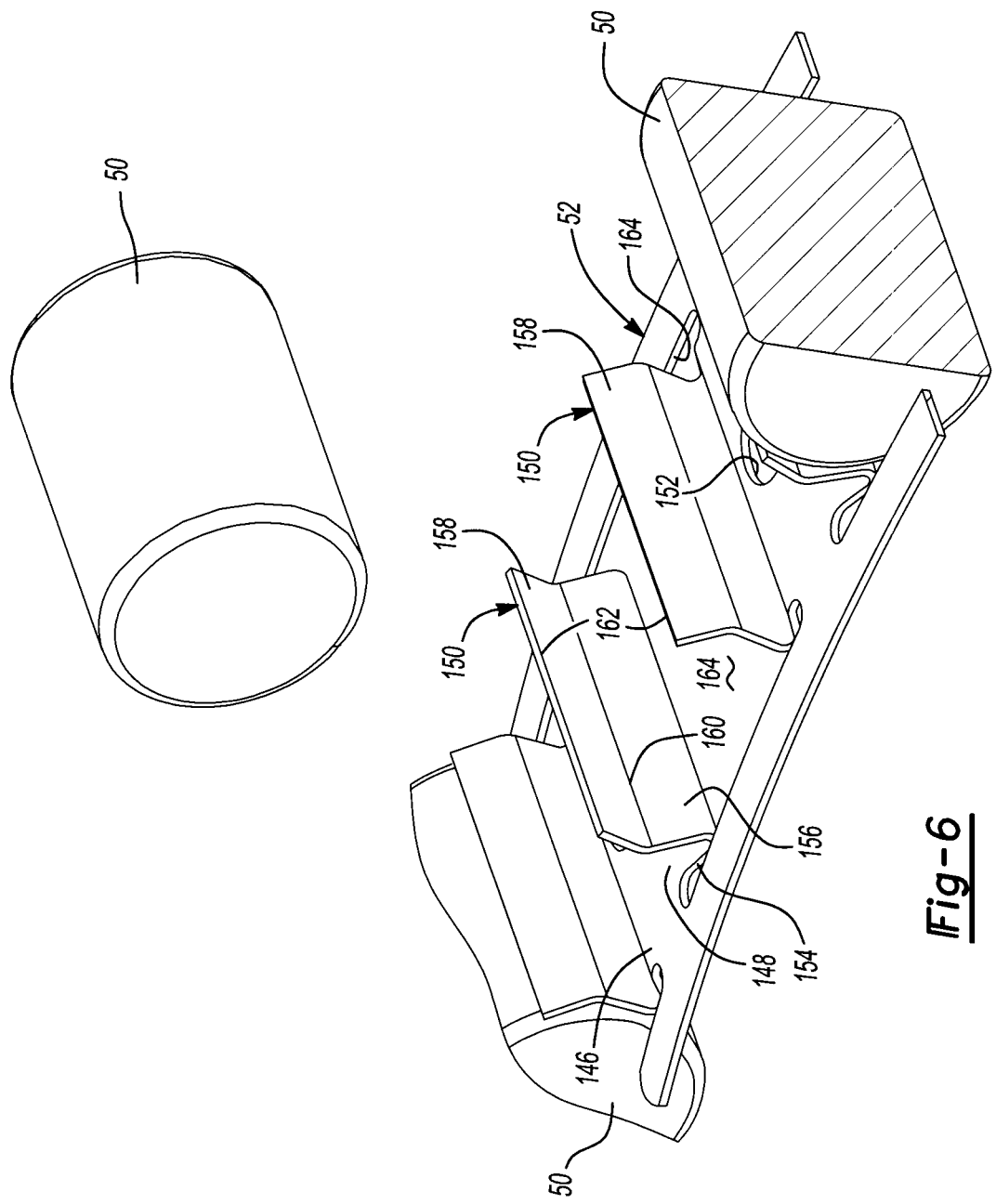
FIG. 6 is a fragmentary exploded perspective view of another portion of the roller clutch.
Figure 7:
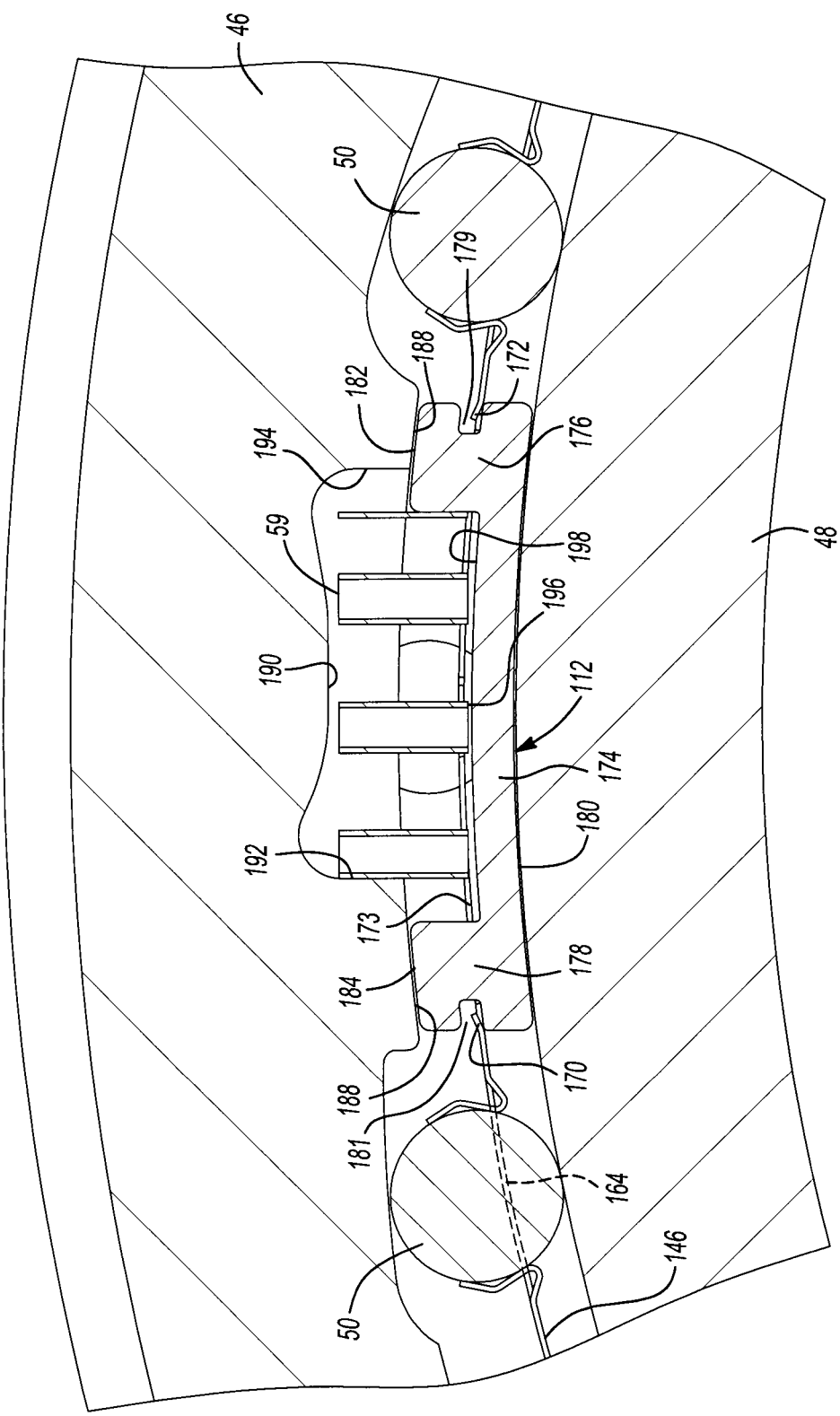
FIG. 7 is a fragmentary cross-sectional view of a portion of the roller clutch.

The following description is merely exemplary in nature and is not intended to limit the present disclosure, application, or uses. It should be understood that throughout the drawings, corresponding reference numerals indicate like or corresponding parts and features.

FIGS. 1-8 depict a high capacity one-way overrunning clutch 10 arranged to selectively transfer torque between rotatable components within an exemplary vehicle 12. Vehicle 12 may be configured as a hybrid vehicle having an internal combustion engine 14 as a first source of motive power. A second source of motive power is provided by an electric motor 16. The schematic of FIG. 1 depicts a pair of driven wheels 18, 20 in receipt of torque provided by internal combustion engine 14 and transferred through a transmission 22. Electric motor 16 is shown in driving communication with another pair of driven wheels 24, 26. One skilled in the art will appreciate that the number of wheels driven by internal combustion engine 14 or electric motor 16 is merely exemplary and that any number of other power transmission arrangements may be implemented including a series hybrid drive, a parallel hybrid drive, or a series/parallel hybrid drive. Alternatively, the vehicle equipped with overrunning clutch 10 need not be a hybrid vehicle but may be solely equipped with an internal combustion engine power source.

During operation of vehicle 12, it is contemplated that internal combustion engine 14 will frequently be stopped and re-started in an attempt to improve fuel efficiency. For example, internal combustion engine 14 may be stopped once a controller 30 determines that the vehicle speed has been below a predetermined threshold for a predetermined amount of time such as when the vehicle is idling at a stop light. Depending on a number of inputs to controller 30, such as a throttle position, vehicle 12 may be propelled solely through power provided by electric motor 16, power provided by both internal combustion engine 14 and electric motor 16 or power provided solely by internal combustion engine 14. Regardless of the control scheme utilized, engine 14 may require frequent restarting.

A starter motor 34 is selectively operable to transfer torque to a crankshaft 38 of engine 14 when controller 30 signals for a starting or re-starting of internal combustion engine 14. Starter 34 includes a pinion gear 36 in constant meshed engagement with a ring gear 40 fixed to a drive plate 42. Ring gear 40 may be formed as one-piece with drive plate 42 or may be a separate component fixed for rotation thereto. Drive plate 42 includes a central aperture 44 in receipt of a portion of clutch 10. Clutch 10 selectively transfers torque between drive plate 42 and crankshaft 38.

Clutch 10 includes an outer race 46 fixed for rotation with drive plate 42, an inner race 48 fixed for rotation with crankshaft 38, a plurality of rollers 50, a cage 52, a multi-spring 54, a seal 56, a seal retainer 58, a plurality of accordion springs 59 and an ID-OD clip 60. Crankshaft 38 is supported for rotation within an engine block 62 by a plurality of bearings (not shown). A block seal 66 is seated within a bore 68 formed within engine block 62. A flexible lip 70 of block seal 66 sealingly engages an outer surface 72 of outer race 46.

A pilot portion 76 of outer race 46 is positioned within aperture 44 of drive plate 42. Pilot portion 76 may be coupled to drive plate 42 in a press-fit arrangement where an inner surface 78 of drive plate 42 is positioned in abutment with a radially extending flange 80 of outer race 46. More particularly, drive plate 42 may be press-fit and microsplined to outer race 46. Alternatively, drive plate 42 and outer race 46 may be welded. An inner diameter of outer race 46 includes a ring groove 82, a seal bore 84, a plurality of cam surfaces 86 and a clip groove 88. Each of grooves 82, 88 and seal bore 84 has a substantially cylindrical shape. Cam surfaces 86 are circumferentially spaced apart from another with each cam surface 86 having a shallow end 92 and a deep end 94 further radially recessed into outer race 46.

Inner race 48 includes a substantially circular cylindrical inner surface 96 in engagement with an outer surface 98 of crankshaft 38. As previously mentioned, inner race 48 is fixed for rotation with crankshaft 38. In one arrangement, inner race 48 is fixed to crankshaft 38 with threaded fasteners (not shown). Inner race 48 includes a stepped set of outer surfaces including a seal bore 100, a roller face 102 and a clip groove 104. Each of features 100, 102, 104 include smooth substantially cylindrically-shaped surfaces. Inner race 48 also includes a flange 106 formed at its axially outboard edge. A plurality of circumferentially spaced apart slots 108 extend through flange 106. A bearing removal tool (not shown) includes spaced legs for cooperation with slots 108 to allow the tool to be coupled to inner race 48 in a bayonet-like manner. The entire clutch 10 may be removed as a single unit using this technique. An alternate method may include threading flange 106 and threadingly engaging a tool with flange 106 to remove clutch 10.

A roller and cage subassembly 110 includes rollers 50, cage 52, multi-spring 54 and a plurality of alignment blocks 112. Roller and cage subassembly 110 may be subsequently inserted between outer race 46 and inner race 48.

Cage 52 may be a molded plastic component or constructed from metal and may be referred to as skeleton 52. Cage 52 includes a first ring 120 and a second ring 122 spaced apart from one another and interconnected by a series of webs 124 axially extending between first ring 120 and second ring 122. Webs 124 are circumferentially spaced apart from one another a predetermined distance corresponding to a desired position of rollers 50 and alignment blocks 112. Webs 124 define a plurality of windows 126 within cage 52 to receive rollers 50 as well as portions of multi-spring 54 as will be described. First ring 120, second ring 122 and select webs 124 have a reduced height at four circumferentially spaced apart locations corresponding to the locations of alignment blocks 112. The cage windows 126 at these locations are larger than the roller windows to accommodate alignment blocks 112 and accordion springs 59.

Multi-spring 54 or spring ring 54 includes a first rim 140 and a second rim 142 axially spaced apart from one another. Each of first rim 140 and second rim 142 are shaped as split rings having gaps 144 formed therein, respectively. A plurality of axially extending supports 146 interconnect first rim 140 and second rim 142. Supports 146 are circumferentially spaced apart from one another and each include a base portion 148 and a pair of upturned, radially outwardly extending, guides 150. Preferably, first rim 140, second rim 142 and supports 146 are integrally formed with one another from one piece of spring steel. Each base portion 148 includes an aperture 152 extending therethrough. Apertures 152 cooperate with radially inwardly extending pegs 153 formed on certain predetermined webs 124. Each guide 150 includes a foot portion 154 extending from base portion 148, a lower leg portion 156 and an upper leg portion 158. Lower leg portion 156 and upper leg portion 158 are substantially planar segments intersecting one another at an angle greater than 90° but less than 180°. A trough 160 is formed at the intersection of lower leg portion 156 and upper leg portion 158.

Guides 150 are spaced apart from one another such that pairs of upper edges 162 of upper leg portions 158 are spaced apart a distance less than a diameter of roller 50. Pairs of troughs 160 are spaced apart from one another a distance greater than the diameter of rollers 50. Accordingly, each roller 50 is captured within a pocket 164 between guides 150, first rim 140 and second rim 142 and free to rotate therein. Each guide 150 is a resilient member movable from its nominal position shown in the Figures. Because each guide 150 is individually movable, each roller 50 may be simultaneously engaged with a roller face 102 and one of cam surfaces 86 to transfer a maximum quantity of torque through clutch 10. The resiliently movable guides 150 allow a somewhat relaxed tolerancing of the components of clutch 10 while assuring that the full complement of rollers 50 transfer torque when required.

Figure 8:
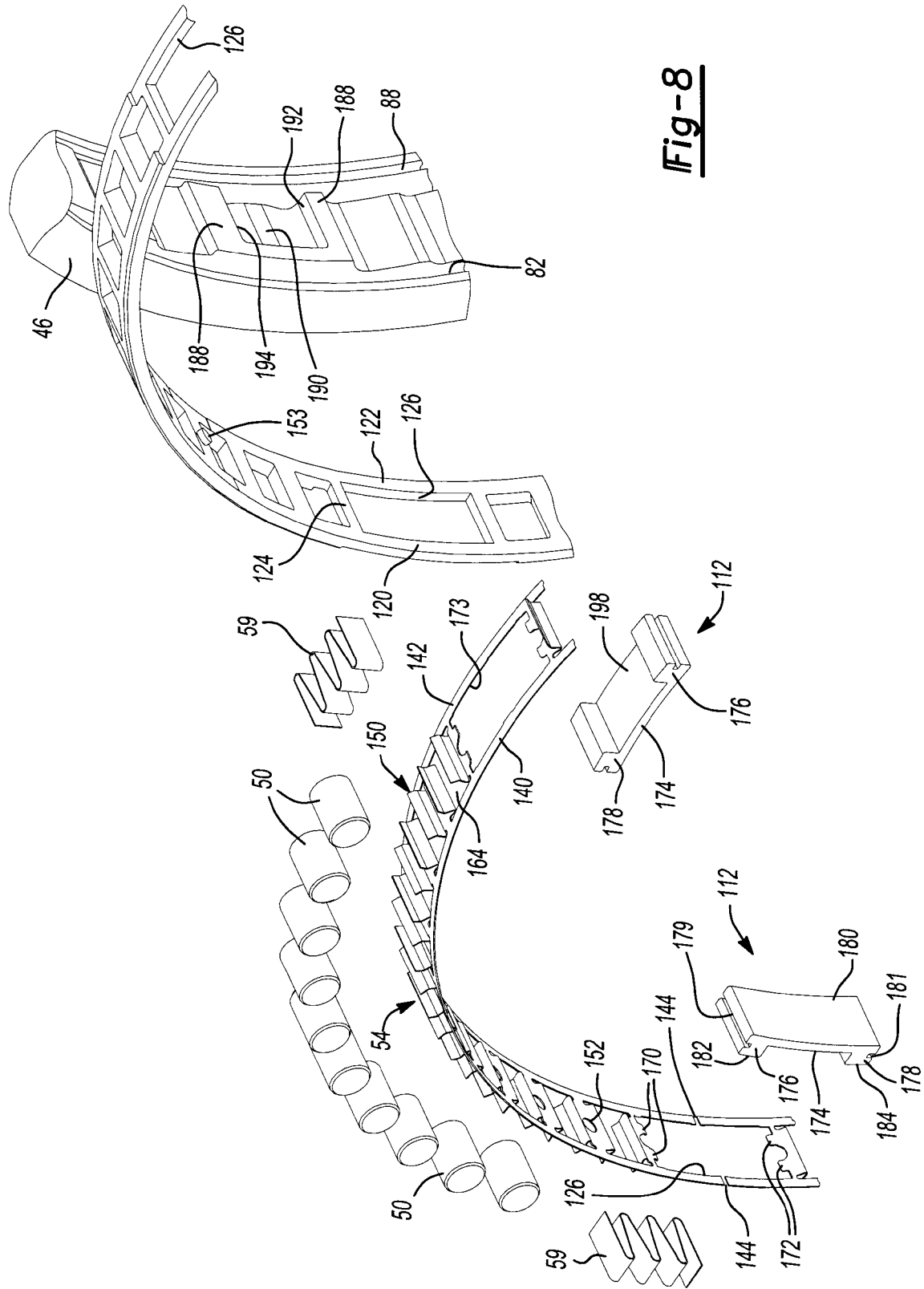
FIG. 8 is a fragmentary exploded perspective view of another portion of the roller clutch.
Figure 8A:
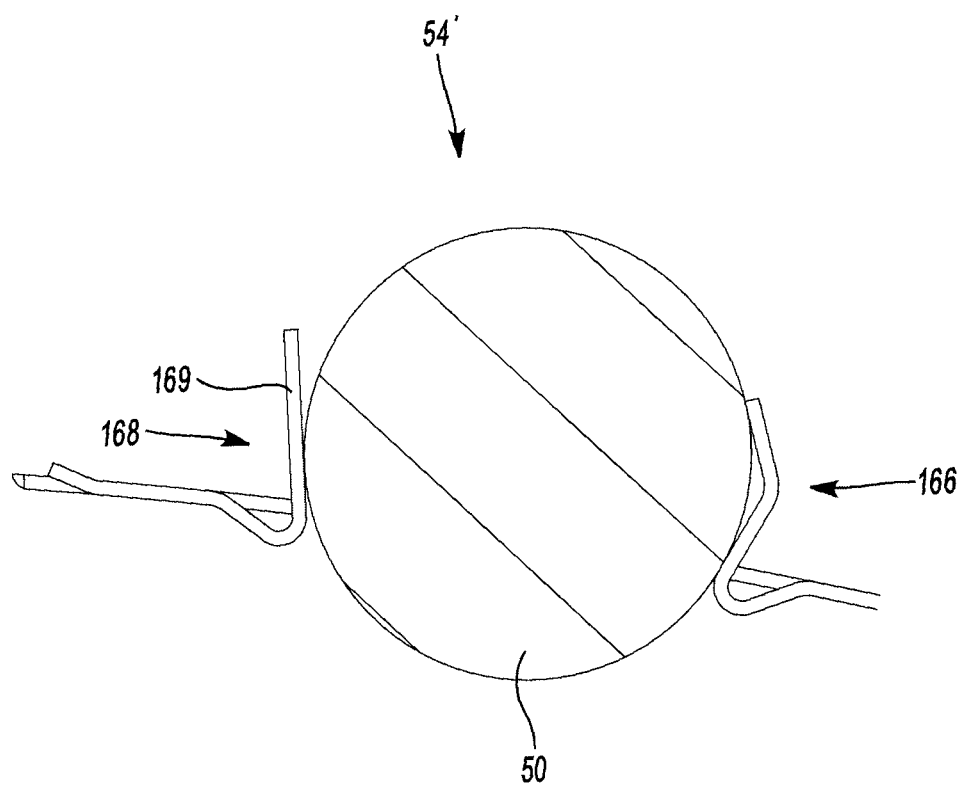
FIG. 8A is a fragmentary cross-sectional view depicting an alternate multi-spring.

FIG. 8A depicts a portion of an alternate multi-spring 54' having one guide 166 shaped as previously described guide 150. An opposing and differently configured guide 168 includes a substantially vertical wall 169. Guide 166 cooperates with guide 168 to provide a three point support for each roller 50.

To assemble roller and cage subassembly 110, rollers 50 are snapped into place within opposing sets of guides 150. In similar fashion, alignment blocks 112 are placed in a snap-fit engagement with opposing pairs of fingers 170, 172 located at ends of apertures 173 and integrally formed as part of multi-spring 54. Each alignment block 112 includes a body portion 174, a first pad 176 and a second pad 178 positioned at opposite ends of body portion 174. Fingers 170, 172 biasedly engage grooves 179, 181 formed in pads 176, 178. Body portion 174 includes an arcuately shaped inner contact surface 180 sized similarly to the radius of curvature of roller face 102. Each pad 176, 178 includes an outer contact face 182, 184. Outer contact faces 182, 184 are arcuately shaped and aligned along a common radius similarly sized to an inner diameter defined by lands 188 formed on outer race 46. A recess 190 is circumferentially positioned between pairs of lands 188 and is defined at least in part by a first stop 192 and a second stop 194. Outer contact faces 182, 184 are radially spaced apart from inner contact surface 180 a distance to allow only minimal misalignment of inner race 48 to outer race 46 when rollers 50 are positioned at or near deep ends 94.

The subassembly of multi-spring 54, rollers 50 and alignment blocks 112 is coupled to cage 52 by inserting pegs 153 through apertures 152. At this time, roller and cage subassembly 110 is complete. Prior to roller and cage subassembly 110 being positioned between inner race 48 and outer race 46, accordion springs 59 are positioned within recesses 190 and cage windows 126. More particularly, a bottom edge 196 of each accordion spring 59 is placed on an outer surface 198 of each body portion 174.

In another arrangement, cage 52 and multi-spring 54 may be integrally formed with one another as a one-piece cage and spring. It is contemplated that the one-piece cage and spring will be constructed from a resilient steel material.

Once roller and cage subassembly 110 and accordion springs 59 are properly positioned between outer race 46 and inner race 48, ID-OD clip 60 interconnects outer race 46 with inner race 48 by being positioned within each of clip groove 88 and clip groove 104. ID-OD clip 60 restricts axial movement of roller and cage subassembly 110 toward internal combustion engine 14. Clearances exist between ID-OD clip 60, inner race 48 and outer race 46 to allow clip 60 to remain within clip groove 88 and clip groove 104 as inner race 48 and outer race 46 rotate relative to one another at speeds up to 6500 RPM.

On the opposite side of roller and cage subassembly 110, a cage retainer plate 204 is positioned in contact with a land 206 formed on outer race 46. Seal 56 is pressed within seal bore 84 to fix seal 56 for rotation with outer race 46. Seal 56 includes lips 205, 207 placed in sliding engagement with seal bore 100 formed on inner race 48. A garter spring 208 biases flexible lip 207 into engagement with seal bore 100. Seal retainer 58 may be shaped as a snap ring and positioned within ring groove 82 in abutment with a metal case portion 210 of seal 56. At this time, clutch 10 is completely assembled and may be handled as a unitary module. As previously mentioned, ID-OD clip 60 restricts roller and cage subassembly 110 from axial movement toward internal combustion engine 14. Similarly, cage retainer plate 204, seal 56 and seal retainer 58 restrict roller and cage subassembly 110 from moving in the opposite axial direction away from internal combustion engine 14.

After completing the assembly of clutch 10, block seal 66 is pressed within bore 68 formed in engine block 62. Clutch 10 is fixed to drive plate 42 by fixing outer race 46 for rotation within aperture 44. The drive plate and clutch assembly is axially displaced to fix inner race 48 for rotation with crankshaft 38 and sealingly engage flexible lip 70 with outer surface 72 of outer race 46. A chamfer 212 is formed on outer race 46 to guide flexible lip 70 toward its proper location.

During vehicle operation, it may be desirable to frequently start and stop internal combustion engine 14. When internal combustion engine 14 is stopped, neither outer race 46 nor inner race 48 are rotating. Accordion springs 59 biasedly engage stop 194 and one of webs 124 to urge rollers 50 toward shallow ends 92 of cam surfaces 86. At this time, clutch 10 is in a locked or torque transferring mode. During a starting sequence, starter motor 34 is energized to rotate pinion gear 36. Through the meshed interconnection of pinion gear 36 and ring gear 40, drive plate 42 and outer race 46 are also rotated. At this time, crankshaft 38 and inner race 48 are not rotating. As such, relative rotation between outer race 46 and inner race 48 occurs urging rollers 50 further toward shallow ends 92 of cam surfaces 86. Rollers 50 are wedged between cam surfaces 86 and roller face 102 to transfer torque between outer race 46 and inner race 48. During the starting operation, clutch 10 is operating in the locked mode and relative motion between seal 56 and inner race 48 does not occur. Relative motion between inner lip 70 of block seal 66 and outer race 46 does occur. However, the duration of the relative rotation is relatively short during the starting sequence.

Once internal combustion engine 14 has started, starter motor 34 is no longer energized. As internal combustion engine 14 runs, crankshaft 38 and inner race 48 rotate faster than outer race 46 and drive plate 42. Cam surfaces 86 urge rollers 50 toward deep ends 94. Force is transferred through multi-spring 54 to cage 52 into accordion springs 59. Accordion springs 59 are compressed and rollers 50 become disengaged with cam surfaces 86 to place clutch 10 in the overrunning mode of operation where torque is not transferred between outer race 46 and inner race 48. At this time, outer race 46 ceases to rotate. Relative rotation between block seal 66 and outer race 46 no longer occurs. Relative rotation between seal 56 and inner race 48 continues while internal combustion engine 14 operates in its torque production mode. As inner race 48 rotates relative to outer race 46, oil enters apertures 214 formed in ID-OD clip 60 to lubricate rollers 50. Oil is not allowed to pass by seal 56 or block seal 66.

The sealed overrunning clutch 10 provides a low cost, compact solution for providing high torque capacity within a small packaging envelope. As previously mentioned, inner race 48 is fixed to crankshaft 38 thereby defining an inner diameter of clutch 10. An outer diameter of clutch 10 is minimized by closely packing as many rollers 50 as possible within the circumferential envelope defined by outer race 46 and inner race 48. In the example depicted in the Figures, forty rollers are utilized. Each roller is substantially cylindrically shaped having a diameter of approximately 4 to 5 mm. The center-to-center distance between adjacent rollers is approximately 7.5 mm. As such, the gap between each adjacent roller is approximately 2.5 to 3.5 mm or 33 to 50% of the roller diameter. This roller sizing and packing configuration provides a theoretical high torque output. To assure that the actual torque capacity of clutch 10 substantially meets the theoretical torque capacity, multi-spring 54 is equipped with resilient guides 150 to assure that each and every roller 50 transfers torque between outer race 46 and inner race 48 when clutch 10 operates in the locked mode.

Figure 9:
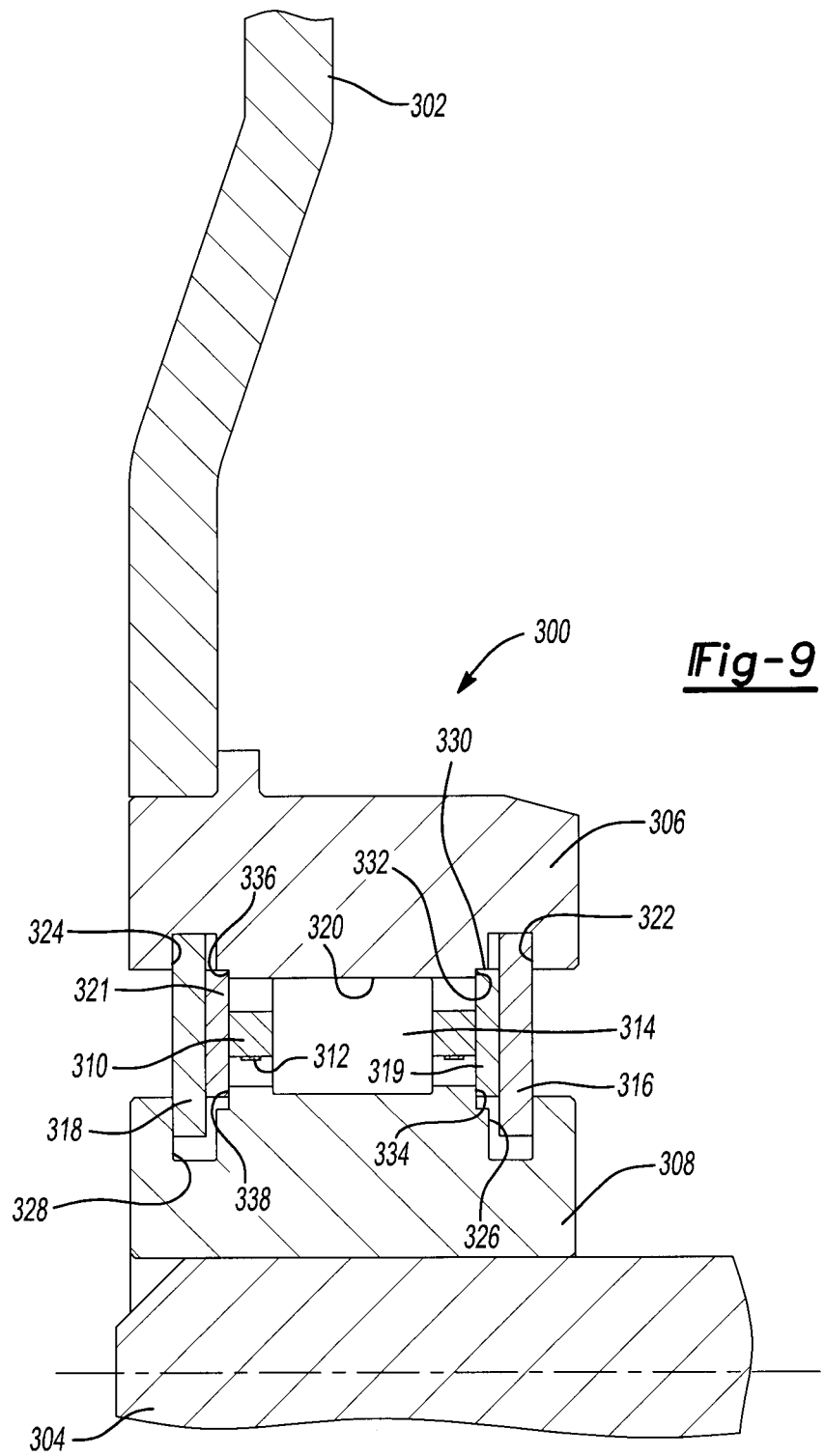
FIG. 9 is a fragmentary cross-sectional view depicting a portion of an internal combustion engine starting system including another sealed high capacity overrunning roller clutch.

FIG. 9 depicts an alternate high capacity one-way overrunning clutch identified at reference numeral 300. Clutch 300 selectively transfers torque between a drive plate 302 and an internal combustion engine and crankshaft 304. One-way clutch 300 is substantially similar to one-way clutch 10 previously described except that one-way clutch 300 is sealed for life and is not in receipt of a flow of lubricating fluid as one-way clutch 10. One-way clutch 300 includes an outer race 306, an inner race 308, a cage 310, a multi-spring 312, and a plurality of rollers 314 configured substantially similarly to the components previously described in relation to clutch 10.

Clutch 300 also includes an inner ID-OD lock ring 316, an outer ID-OD lock ring 318, an inner seal plate 319 and an outer seal plate 321 positioned adjacent to their respective lock rings. The ID-OD lock rings 316, 318 and the seal plates 319, 321 not only restrict relative axial movement between inner race 308 and outer race 306, but enclose a cavity 320 formed between inner race 308, outer race 306 and the inner and outer seal plates 319, 321. To accommodate the dual lock rings, outer race 306 includes an inner ring groove 322 and an outer ring groove 324. Inner race 308 includes an inner ring groove 326 axially aligned with inner ring groove 322 as well as an outer ring groove 328 axially aligned with outer ring groove 324.

Inner seal plate 319 includes an outer lip 330 positioned within an annular land 332 formed in outer race 306 adjacent inner ring groove 322. Land 332 and seal plate 319 are sized such that inner ID-OD lock ring 316 fixes inner seal plate 319 for rotation with outer race 306. Another land 334 is formed adjacent inner ring groove 326 of inner race 308. Land 334 is sized such that seal plate 319 remains clear of inner race 308 during operation of clutch 300. It should be appreciated that the clearance between seal plate 319 and inner race 308 is minimal to limit the ingress of contamination past inner ID-OD lock ring 316 and inner seal plate 319.

Outer seal plate 321 is similarly positioned within a land 336 formed adjacent outer ring groove 324. Outer seal plate 321 is fixed for rotation with outer race 306 by outer ID-OD lock ring 318. Seal plate 321 is positioned within another land 338 formed in inner race 308. Seal plate 321 is maintained in a position clear of inner race 308 to allow minimally restricted relative rotation between outer race 306 and inner race 308.

ID-OD lock rings 316, 318 and seal plates 319, 321 are formed as solid members and do not include apertures similar to apertures 214 of ID-OD clip 60. In this manner, contaminants are restricted from entering cavity 320. Furthermore, a more viscous lubricant, such as a grease, may be placed within cavity 320 to lubricate clutch 300 for life. Seal plates 319, 321 and ID-OD lock rings 316, 318 restrict the grease from exiting cavity 320.

Figure 10:
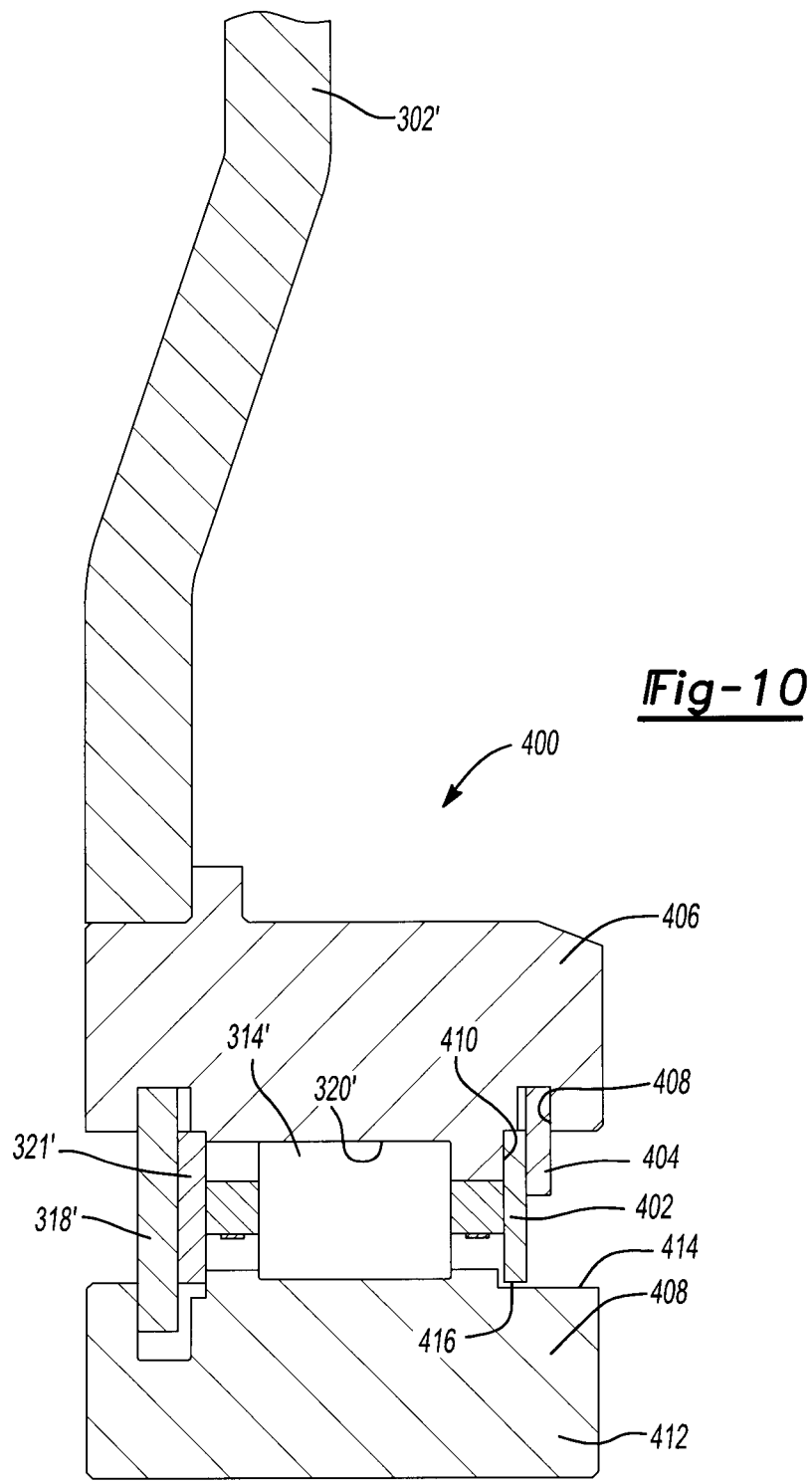
FIG. 10 is a fragmentary cross-sectional view depicting a portion of an internal combustion engine starting system including another sealed high capacity overrunning roller clutch.

FIG. 10 depicts another sealed for life one-way clutch identified at reference numeral 400. One-way clutch 400 is substantially similar to one-way clutch 300. Accordingly, like elements will retain their previously introduced reference numerals including a prime suffix.

One-way clutch 400 differs from one-way clutch 300 in that an inner ID-OD lock ring is not used. In its place, a circular seal plate 402 and a snap ring 404 are installed. In particular, an outer race 406 includes a snap ring groove 408 and an annular land 410 positioned adjacent groove 408. The thickness of seal plate 402 and snap ring 404, as well as the depth of the cuts positioning annular land 410 and ring groove 408, cooperate with one another such that seal plate 402 is fixed for rotation with outer race 406. An inner race 412 includes a recess 414 in receipt of an inner edge 416 of seal plate 402. Recess 414 is sized to maintain clearance between inner race 412 and seal plate 402. It should be appreciated that the clearance between these components is minimal such that seal plate 402 restricts ingress of contaminants within cavity 320' and/or contains grease therein.

Figure 11:
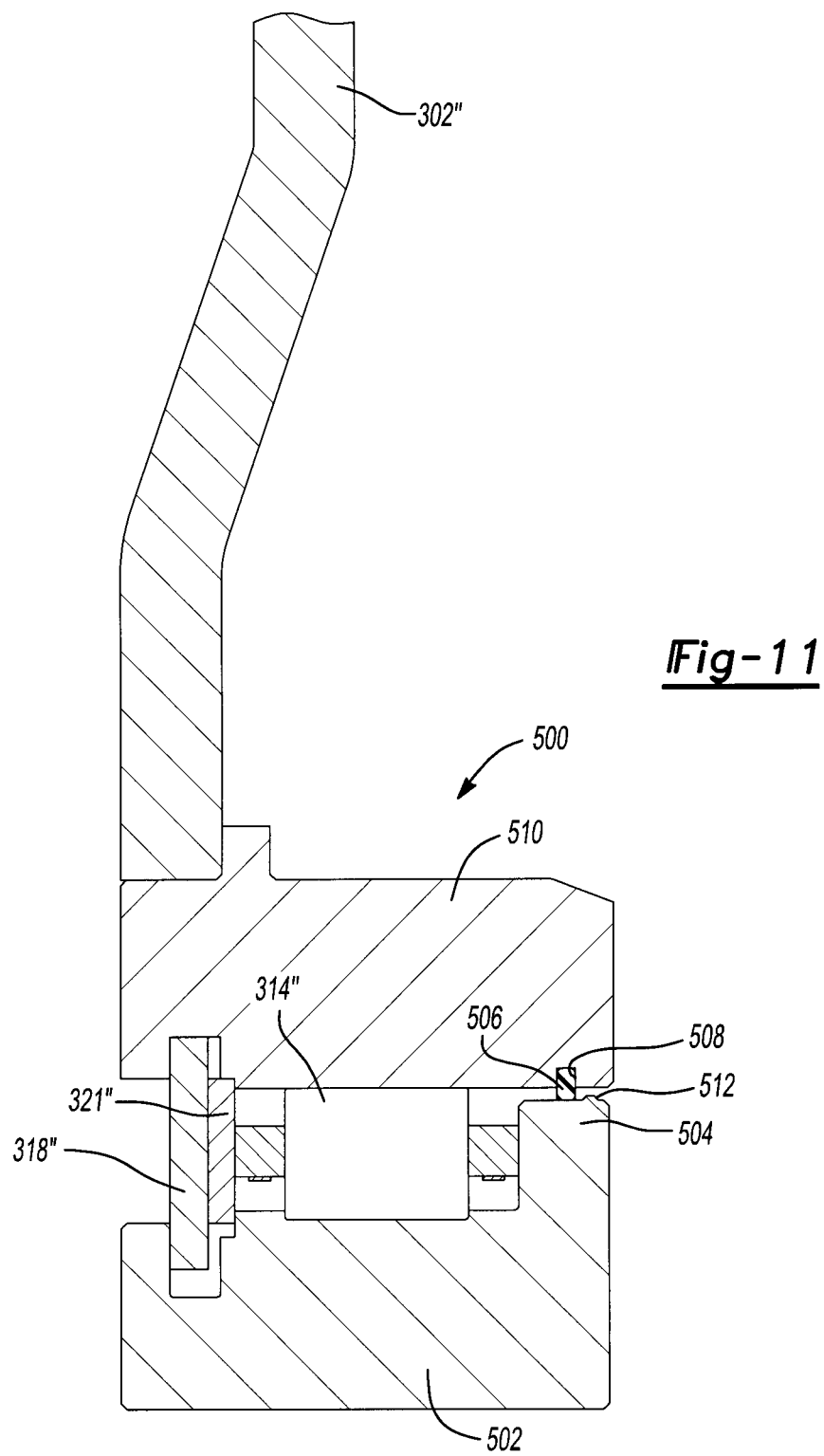
FIG. 11 is a fragmentary cross-sectional view depicting a portion of an internal combustion engine starting system including another sealed high capacity overrunning roller clutch.

Another alternate sealed for life one-way clutch 500 is shown at FIG. 11. One-way clutch 500 is substantially similar to one-way clutch 400. As such, only significant differences will be described in detail. One-way clutch 500 includes an inner race 502 having a radially inwardly extending flange 504. An elastomeric seal 506 is positioned within a groove 508 formed on an outer race 510. Inner race 502 is free to rotate relative to seal 506. A radially inwardly extending protrusion 512 is formed near the inboard edge of inner race 502 to further restrict contaminant access to seal 506. An outboard portion of clutch 500 includes outer ID-OD lock ring 318" and outer seal plate 321" as previously described in relation to clutch 300.

Figure 12:
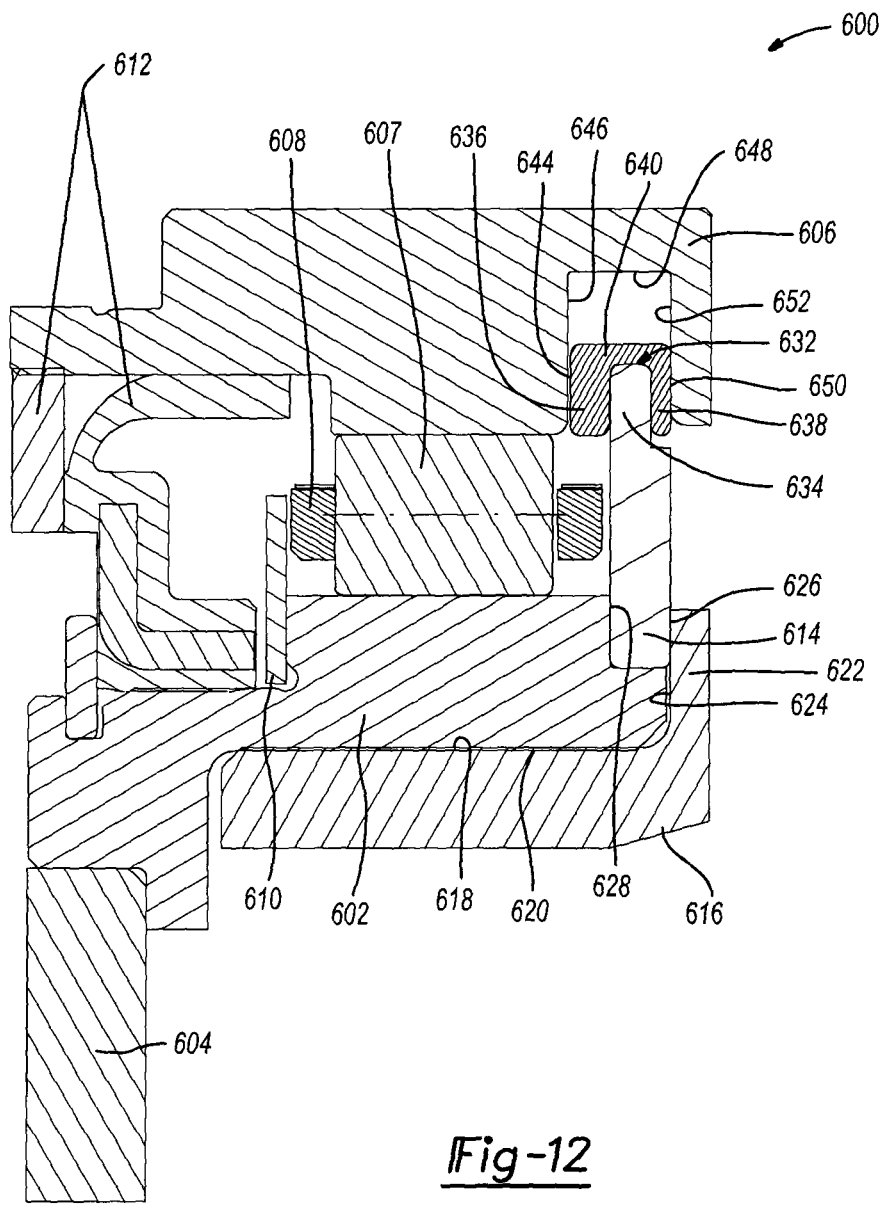
FIG. 12 is a fragmentary cross-sectional view of an alternate clutch equipped with a cap and a shoe.

FIG. 12 depicts another clutch identified at reference numeral 600. Clutch 600 includes an outer race 602 fixed for rotation with a drive plate 604, an inner race 606, rollers 607, a cage 608, a cage retainer plate 610, a seal 612 and an ID-OD clip 614. Clutch 600 also includes a cap 616 that is coupled to outer race 602 via a shrink fit process. Accordingly, an inner cylindrical surface 618 of cap 616 applies a compressive force to an outer cylindrical surface 620 of outer race 602. The compressive force offsets a hoop stress occurring in outer race 602 when clutch 600 is locked.

Furthermore, cap 616 includes a radially inwardly extending flange 622 having a substantially planar inner face 624. Planar face 624 engages a face 626 of ID-OD clip 614. ID-OD clip 614 is trapped between flange 622 and a land 628 formed on outer race 602. Cap 616 functions to lock ID-OD clip 614 to outer race 602. ID-OD clip 614 is restricted from rotation relative to outer race 602 during clutch operation.

Clutch 600 also includes a shoe 632 fixed to an inner diameter portion 634 of ID-OD clip 614. Shoe 632 includes a "C"-shaped cross section having a first leg 636 and a second leg 638 interconnected by an end wall 640. Shoe 632 may be formed from bronze, a polymer or some other friction reducing guide material. Shoe 632 may be fixed to ID-OD clip 614 by a number of methods including mechanical fasteners such as rivets or via an adhesive. Alternatively, shoe 632 may be overmolded to ID-OD clip 614. In yet another version, shoe 632 may be formed from two pieces where the shoe is fixed with a mechanical lock that may separate under load conditions. First leg 636 includes a guide surface 644 spaced apart from a side wall 646 of a groove 648 formed in inner race 606. Similarly, second leg 638 includes a guide face 650 spaced apart from an opposite side wall 652 of groove 648.

Figure 13:
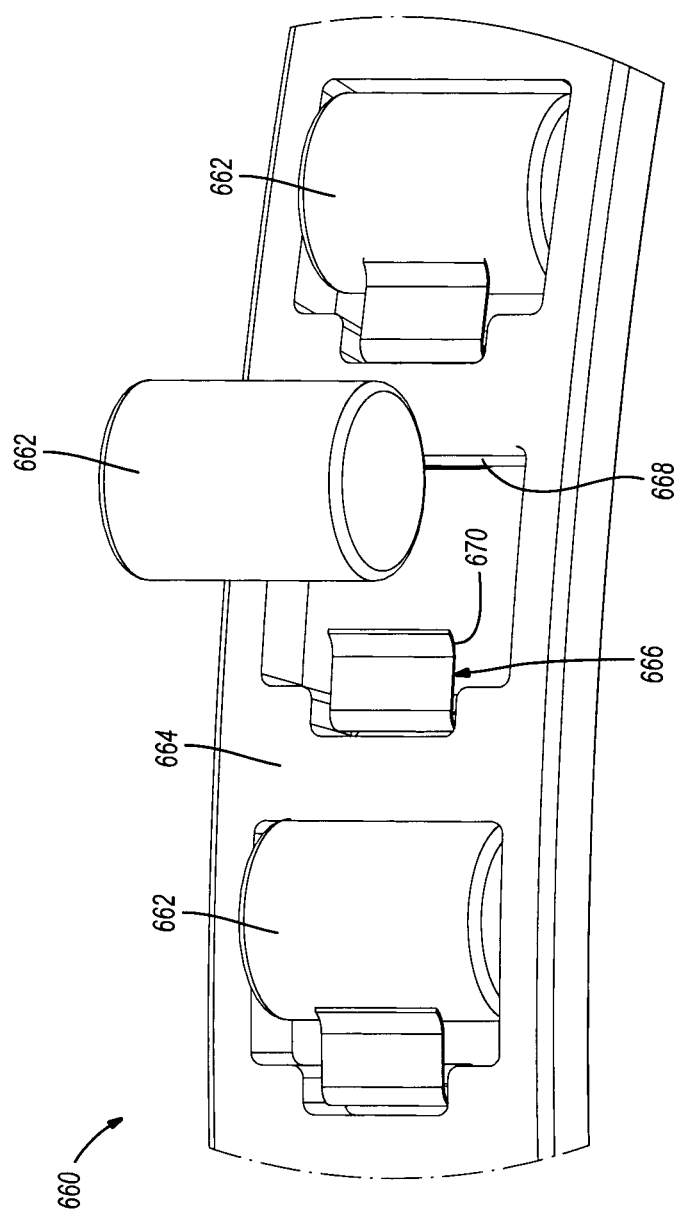
FIG. 13 is a fragmentary perspective view of an alternate cage and roller subassembly.
Figure 14:
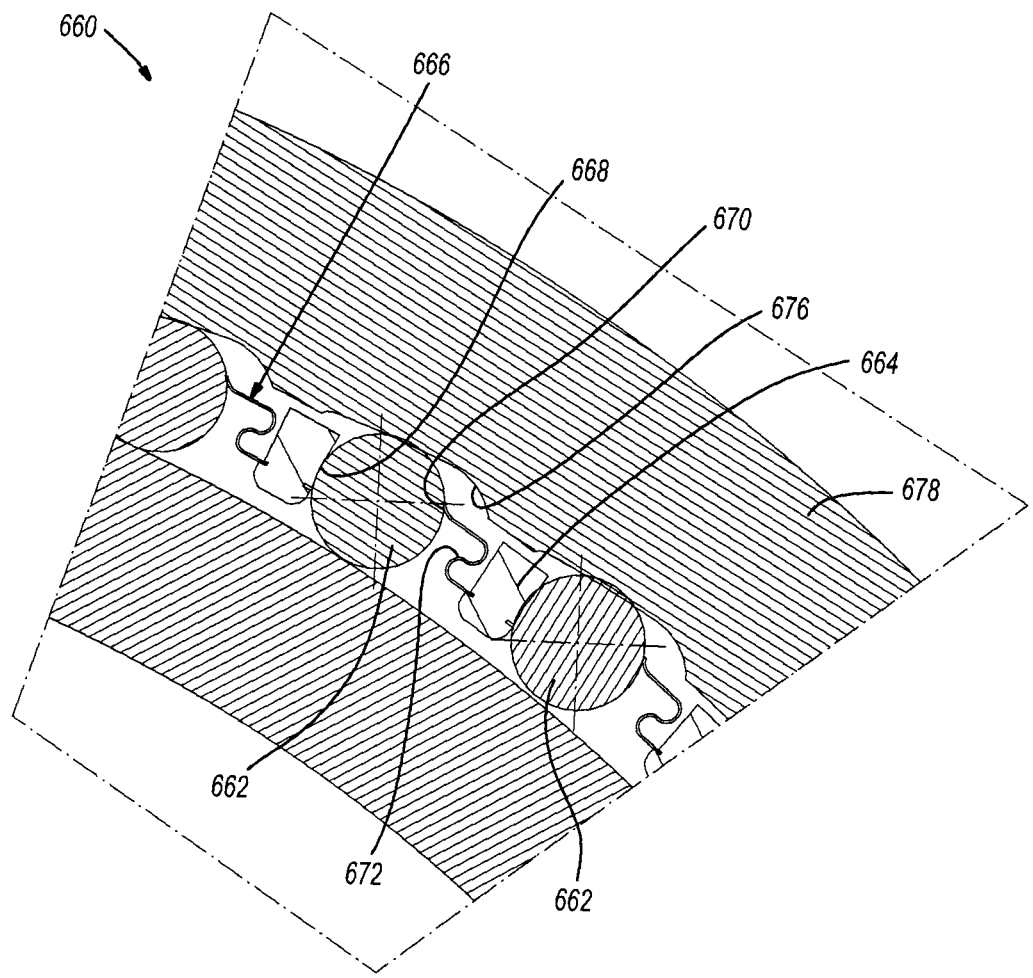
FIG. 14 is a fragmentary sectional view of the cage and roller assembly shown in FIG. 13.

FIGS. 13 and 14 depict an alternate roller and cage subassembly 660 including rollers 662, a cage 664 and a multi-spring 666. Each roller 662 is trapped between a concave surface 668 formed on cage 664 and a convexedly-shaped distal end 670 of multi-spring 666. A body portion 672 of multi-spring 666 includes a serpentine shape thereby allowing distal end 670 to deflect during clutch operation. Distal end 670 biases roller 662 toward concave surface 668. Roller 662 is positioned in a groove 676 formed in an outer race 678.

Figure 15:
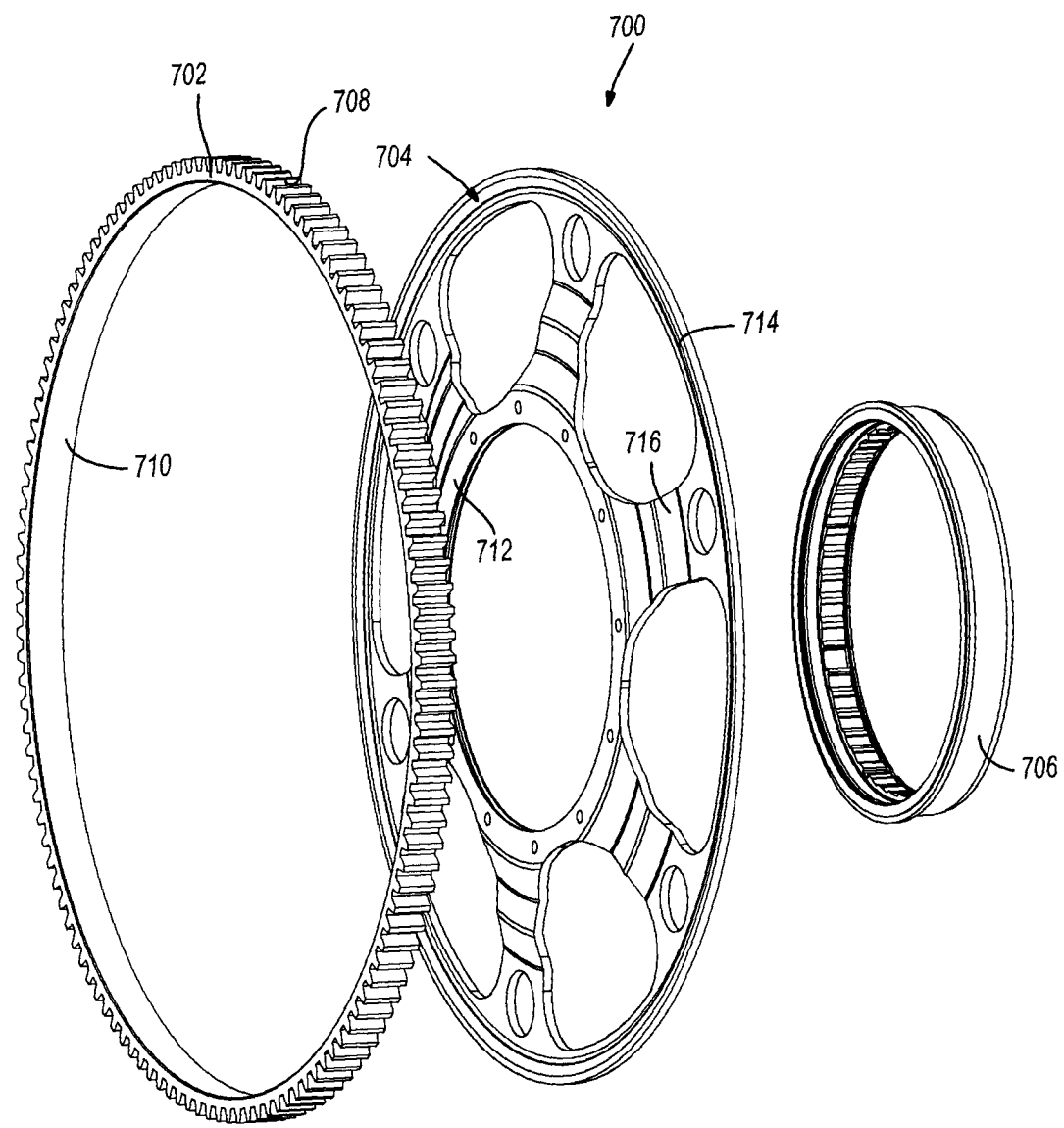
FIG. 15 is an exploded perspective view of an alternate drive plate assembly.

FIG. 15 depicts an alternate drive plate 700 including a gear 702, a hub 704 and an outer race 706. Gear 702 is preferably constructed from a metal such as hardenable steel and includes a plurality of external teeth 708, as well as a substantially inner cylindrical surface 710. Hub 704 includes an inner ring 712, an outer ring 714 and a plurality of radially extending spokes 716 interconnecting outer ring 714 and inner ring 712. Hub 704 is preferably constructed from a lightweight material such as a polymer. Outer race 706 is preferably constructed from a metal such as a hardenable steel and is substantially similar to the outer races previously described. Drive plate 700 may be constructed using a overmolding process where outer race 706 and gear 702 are placed within an injection mold cavity. Molten resin is injected into the mold cavity to define hub 704 while simultaneously fixing outer ring 714 to gear 702 as well as fixing inner ring 712 to outer race 706. The relatively low weight and low cost drive plate 700 may be used in conjunction with any of the clutches previously described.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A starting system for an internal combustion engine having a crankshaft rotatably supported within an engine block, the starting system comprising:
    a starter motor;
    a pinion gear selectively driven by the starter motor;
    a drive plate having a set of teeth in constant meshed engagement with the pinion gear;
    an overrunning clutch assembly adapted to selectively drivingly interconnect the drive plate and the crankshaft, the clutch assembly including an inner race adapted to be fixed for rotation with the crankshaft, an outer race fixed for rotation with the drive plate and having circumferentially spaced apart cam surfaces, and a plurality of roller elements positioned radially therebetween, the clutch assembly also including a cage assembly, a seal and a retaining ring, the cage assembly having a skeleton coupled to a spring ring, the spring ring including a plurality of radially extending guides, the guides being arranged to circumferentially space apart each roller element in alignment with the cam surfaces, the guides being resiliently deformable to allow concurrent engagement of each roller element with both the inner and outer races, the seal engaging an inner surface of the outer race and an outer surface of the inner race, the seal being positioned axially outboard of the roller elements, the retaining ring being positioned with ring grooves formed on each of the inner and outer races to restrict movement of the cage; and
    a plurality of circumferentially spaced apart alignment blocks coupled to the spring ring for maintaining concentricity between the inner and outer races when the clutch operates in an overrunning mode,
    wherein the spring ring includes a plurality of apertures circumferentially spaced from one another by the guides, and each of the alignment blocks is disposed within one of the apertures,
    wherein each of the alignment blocks includes a body portion and a first pad and a second pad disposed at opposite sides of the body portion, each of the first pad and the second pad of the alignment blocks defining a groove, and
    wherein the spring ring includes fingers disposed along the apertures in biased engagement with one of the grooves to establish a snap-fit engagement between the alignment blocks and the spring ring.

2. The system of claim 1 wherein the retaining ring includes a plurality of oil passages extending therethrough.

3. The system of claim 2 wherein the roller elements, the oil passages and the seal are positioned along substantially the same radius.

4. The system of claim 3 wherein the seal includes an outer diameter larger than a diameter defined by the cam surfaces.

5. The system of claim 4 wherein the seal includes an inner diameter smaller than a diameter defined by a roller element contact surface on the inner race.

6. The system of claim 1 further including a seal retainer positioned in a groove formed in the outer race and in engagement with the seal.

7. The system of claim 1 further including a block seal adapted to engage the engine block and the outer race.

8. The system of claim 1 wherein the retaining ring remains positioned within each of the ring grooves formed on the inner and outer races at relative rotational speeds between the races exceeding 6500 RPM.

9. The system of claim 1 further including a spring acting on the cage assembly and the outer race to engage the roller elements with the cam surfaces and the inner race to place the clutch in a torque transferring mode.

10. The system of claim 9 wherein the spring is positioned within a recess formed in one of the alignment blocks.

11. The system of claim 1 wherein the inner race includes an outboard flange including spaced apart slots extending therethrough adapted to receive a clutch puller for removing the clutch assembly as one piece.

12. The system of claim 1 wherein the inner race includes a threaded bore adapted to receive a correspondingly threaded tool for removing the clutch assembly as one piece.

13. An overrunning clutch assembly comprising:
    an inner race adapted to be fixed for rotation with a first rotatable member;
    an outer race having circumferentially spaced apart cam surfaces and being adapted to be fixed for rotation with a second rotatable member;
    a plurality of roller elements positioned radially between and in selective engagement with the inner and outer races;
    a cage coupled to a spring ring, the spring ring including a plurality of radially extending guides, the guides being arranged in pairs to align each roller element with the cam surfaces, the guides being resiliently deformable to allow concurrent engagement of each roller element with both the inner and outer races;

a seal engaging an inner surface of the outer race and an outer surface of the inner race and being positioned axially outboard of the roller elements; and a plurality of circumferentially spaced apart alignment blocks coupled to the spring ring for maintaining concentricity between the inner and outer races when the clutch operates in an overrunning mode, wherein the roller elements, the oil passages and the seal are positioned along substantially the same radius, wherein the spring ring includes a plurality of apertures circumferentially spaced from one another by the guides, and each of the alignment blocks are disposed within one of the apertures, wherein each of the alignment blocks includes a body portion and a first pad and a second pad disposed at opposite sides of the body portion, each of the first pad and the second pad of the alignment blocks defining a groove, and wherein the spring ring includes fingers disposed along the apertures in biased engagement with one of the grooves to establish a snap-fit engagement between the alignment block and the spring ring.

14. The clutch assembly of claim 13 further including a retaining ring being positioned within ring grooves formed on each of the inner and outer races to restrict movement of the cage.

15. The clutch assembly of claim 14 wherein the retaining ring includes a plurality of oil passages extending therethrough.

16. The clutch assembly of claim 13 wherein the cage includes first and second spaced apart rings interconnected by axially extending webs.

17. The clutch assembly of claim 16 wherein pairs of guides radially extend between adjacent pairs of webs.

18. The clutch assembly of claim 13 wherein each roller element has a diameter and adjacent roller elements have a space therebetween less than one roller diameter.

19. The clutch assembly of claim 14 wherein the retaining ring remains positioned within each of the ring grooves formed on the inner and outer races at relative rotational speeds between the races in excess of 6500 RPM.

20. The clutch assembly of claim 13 further including a spring acting on the cage and the outer race to engage the roller elements with the cam surfaces and the inner race to place the clutch in a torque transferring mode.

21. The clutch assembly of claim 13 wherein the spring is positioned within a recess formed in one of the alignment blocks.

22. The clutch assembly of claim 13 wherein the inner race includes an outboard flange including spaced apart slots extending therethrough adapted to receive a clutch puller for removing the clutch assembly as one piece.

23. The clutch assembly of claim 13 wherein the cage and the spring ring are integrally formed with one another as a monolithic cage spring.

24. An overrunning clutch assembly comprising:

an inner race adapted to be fixed for rotation with a first rotatable member;

an outer race having circumferentially spaced apart cam surfaces and being adapted to be fixed for rotation with a second rotatable member;

a plurality of roller elements positioned radially between and in selective engagement with the inner and outer races;

a cage coupled to a spring ring, the spring ring including a plurality of radially extending guides, the guides being arranged to align each roller element with the cam surfaces, the guides being resiliently deformable to allow concurrent engagement of each roller element with both the inner and outer races;

a retaining ring being positioned within ring grooves formed on each of the inner and outer races to restrict movement of the cage; and at least one circumferentially spaced apart alignment block coupled to the spring ring for maintaining concentricity between the inner and outer races when the clutch operates in an overrunning mode, wherein the alignment block is disposed within an aperture defined by the spring ring, wherein the alignment block includes a body portion and a first pad and a second pad disposed at opposite sides of the body portion, each of the first pad and the second pad of the alignment block defining a groove, and wherein the spring ring includes fingers disposed along the aperture in biased engagement with one of the grooves to establish a snap-fit engagement between the alignment block and the spring ring.

25. The assembly of claim 24 further including a seal plate positioned between the retaining ring and the roller elements to retain a lubricant in contact with the roller elements.

26. The assembly of claim 25 further including another retaining ring being positioned within ring grooves formed on each of the inner and outer races to restrict movement of the cage.

27. The assembly of claim 25 further including another seal plate positioned on an opposite axial side of the roller elements as the retaining ring, the seal plates restricting ingress of contaminants between the inner and outer races.

28. The assembly of claim 24 wherein the guides are arranged in pairs.

29. The assembly of claim 24 wherein only a single guide contacts each roller.

30. The assembly of claim 29 wherein the guide biases the roller toward a concave surface of the cage.

31. The assembly of claim 24 further including a cap including an inner surface circumscribing and being biasedly engaged with an outer surface of the outer race.

32. The assembly of claim 31 wherein the cap is fixed to the outer race in a shrink fit.

33. The assembly of claim 31 wherein the cap includes a flange engaging the retaining ring to restrict relative rotation between the outer race and the retaining ring.

34. The assembly of claim 24 further including a shoe coupled to the retaining ring and positioned within the inner race groove.

35. The assembly of claim 34 wherein the shoe includes one of a bronze and a polymeric material.

36. The assembly of claim 24 further including a polymeric hub overmolded to the outer race and an externally toothed ring gear.

* * * * *